United States Patent
Faith et al.

(10) Patent No.: US 9,773,246 B2
(45) Date of Patent: Sep. 26, 2017

(54) PRE-AUTHORIZATION OF A TRANSACTION USING PREDICTIVE MODELING

(71) Applicant: Visa International Service Association, San Francisco, CA (US)

(72) Inventors: Patrick Faith, Pleasanton, CA (US); Kevin P. Siegel, Milpitas, CA (US); Ayman Hammad, Pleasanton, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 348 days.

(21) Appl. No.: 13/710,059

(22) Filed: Dec. 10, 2012

(65) Prior Publication Data

US 2014/0006284 A1    Jan. 2, 2014

Related U.S. Application Data

(63) Continuation of application No. 12/773,763, filed on May 4, 2010, now Pat. No. 8,352,315.
(Continued)

(51) Int. Cl.
*G06Q 30/00* (2012.01)
*G06Q 20/40* (2012.01)
(Continued)

(52) U.S. Cl.
CPC ... *G06Q 20/4016* (2013.01); *G06Q 10/06375* (2013.01); *G06Q 20/40* (2013.01);
(Continued)

(58) Field of Classification Search
CPC ............... G06Q 30/00; G06Q 30/0233; G06Q 30/0211; G06Q 30/02; G06Q 10/10
(Continued)

(56) References Cited

U.S. PATENT DOCUMENTS

| 4,908,761 A | 3/1990 | Tai |
| 5,283,829 A | 2/1994 | Anderson |

(Continued)

FOREIGN PATENT DOCUMENTS

| KR | 10-2000-0072818 A | 12/2000 |
| KR | 10-0521752 B1 | 10/2005 |

(Continued)

OTHER PUBLICATIONS

Canadian Office Action for Canadian Patent Application No. 2,760,835. Mailed on Oct. 21, 2013. 3 pages.
(Continued)

*Primary Examiner* — Seye Iwarere
(74) *Attorney, Agent, or Firm* — Kilpatrick Townsend & Stockton LLP

(57) ABSTRACT

Systems, apparatus, and methods are provided for efficiently authorizing a transaction initiated by a consumer. An authorization can be generated before the consumer actually initiates the transaction. For example, a future transaction can be predicted, and an authorization can be generated for the predicted transaction. In this manner, the authorization can be ready and quickly used when the consumer does initiate the transaction. Previous transactions made by the consumer can be used to predict when the future transaction is likely. In various examples, the authorization can be sent to a specific merchant or to the consumer for use when the consumer initiates the predicted transaction, or saved by an authorization server for use in response to an authorization request from the merchant.

25 Claims, 7 Drawing Sheets

Related U.S. Application Data

(60) Provisional application No. 61/175,381, filed on May 4, 2009.

(51) Int. Cl.
    *G06Q 30/02*         (2012.01)
    *G06Q 10/06*         (2012.01)
    *G06Q 40/00*         (2012.01)
    *G06Q 10/04*         (2012.01)

(52) U.S. Cl.
    CPC .......... *G06Q 30/02* (2013.01); *G06Q 30/0202* (2013.01); *G06Q 30/0205* (2013.01); *G06Q 30/0224* (2013.01); *G06Q 40/00* (2013.01); *G06Q 40/12* (2013.12); *G06Q 10/04* (2013.01)

(58) Field of Classification Search
    USPC .................................. 705/14.1, 14.3, 39, 35
    See application file for complete search history.

(56) References Cited

U.S. PATENT DOCUMENTS

| | | | |
|---|---|---|---|
| 5,710,578 A | 1/1998 | Beauregard et al. | |
| 5,819,226 A | 10/1998 | Gopinathan et al. | |
| 5,974,396 A | 10/1999 | Anderson et al. | |
| 6,018,723 A | 1/2000 | Siegel et al. | |
| 6,018,724 A | 1/2000 | Arent | |
| 6,119,103 A | 9/2000 | Basch et al. | |
| 6,226,624 B1* | 5/2001 | Watson et al. | 705/44 |
| 6,334,110 B1 | 12/2001 | Walter et al. | |
| 6,422,462 B1* | 7/2002 | Cohen | G06Q 20/105 |
| | | | 235/380 |
| 6,430,359 B1 | 8/2002 | Yuen et al. | |
| 6,430,539 B1 | 8/2002 | Lazarus et al. | |
| 6,658,393 B1 | 12/2003 | Basch et al. | |
| 6,725,210 B1 | 4/2004 | Key et al. | |
| 7,039,607 B2 | 5/2006 | Watarai et al. | |
| 7,165,037 B2 | 1/2007 | Lazarus et al. | |
| 7,197,474 B1 | 3/2007 | Kitts | |
| 7,227,950 B2 | 6/2007 | Faith et al. | |
| 7,251,624 B1 | 7/2007 | Lee et al. | |
| 7,376,618 B1 | 5/2008 | Anderson et al. | |
| 7,505,931 B2 | 3/2009 | Da Silva | |
| 7,533,038 B2 | 5/2009 | Blume et al. | |
| 7,555,444 B1* | 6/2009 | Wilson | G06Q 30/02 |
| | | | 705/14.41 |
| 7,630,924 B1 | 12/2009 | Collins et al. | |
| 7,653,594 B2 | 1/2010 | Davis | |
| 7,881,822 B2 | 2/2011 | Thornton et al. | |
| 7,959,074 B1* | 6/2011 | Chopra | G06Q 20/405 |
| | | | 235/375 |
| 8,032,410 B2* | 10/2011 | Main | G06Q 30/02 |
| | | | 705/14.1 |
| 8,352,315 B2 | 1/2013 | Faith et al. | |
| 8,490,869 B2* | 7/2013 | Brown | G06Q 20/10 |
| | | | 235/380 |
| 8,560,449 B1* | 10/2013 | Sears | 705/42 |
| 2001/0003099 A1 | 6/2001 | Von Kohorn | |
| 2001/0032878 A1 | 10/2001 | Tsiounis et al. | |
| 2002/0032609 A1 | 3/2002 | Wilkman | |
| 2002/0035539 A1* | 3/2002 | O'Connell | G06Q 20/02 |
| | | | 705/39 |
| 2002/0042718 A1 | 4/2002 | Jett | |
| 2002/0099649 A1 | 7/2002 | Lee et al. | |
| 2002/0111907 A1* | 8/2002 | Ling | 705/41 |
| 2002/0169720 A1* | 11/2002 | Wilson et al. | 705/44 |
| 2002/0174222 A1 | 11/2002 | Cox | |
| 2002/0188510 A1* | 12/2002 | Arias | 705/14 |
| 2003/0028481 A1* | 2/2003 | Flitcroft | G06Q 20/00 |
| | | | 705/39 |
| 2003/0061172 A1* | 3/2003 | Robinson | 705/67 |
| 2003/0065555 A1 | 4/2003 | von Gonten et al. | |
| 2003/0177087 A1 | 9/2003 | Lawrence | |
| 2004/0034570 A1 | 2/2004 | Davis | |
| 2004/0039676 A1 | 2/2004 | Trainer | |
| 2004/0117261 A1 | 6/2004 | Walker et al. | |
| 2004/0138958 A1 | 7/2004 | Watarai et al. | |
| 2004/0148254 A1 | 7/2004 | Hauser | |
| 2004/0167823 A1 | 8/2004 | Neely et al. | |
| 2004/0230535 A1 | 11/2004 | Binder et al. | |
| 2004/0249712 A1 | 12/2004 | Brown et al. | |
| 2005/0080806 A1 | 4/2005 | Doganata et al. | |
| 2005/0125317 A1 | 6/2005 | Winkelman et al. | |
| 2005/0131808 A1* | 6/2005 | Villa | G06Q 20/10 |
| | | | 705/39 |
| 2005/0131816 A1* | 6/2005 | Britto | G06Q 20/00 |
| | | | 705/39 |
| 2005/0154629 A1 | 7/2005 | Matsuda et al. | |
| 2005/0197954 A1 | 9/2005 | Maitland et al. | |
| 2005/0267809 A1 | 12/2005 | Zhens | |
| 2006/0097043 A1* | 5/2006 | Johnson | G06Q 20/20 |
| | | | 235/383 |
| 2006/0143071 A1 | 6/2006 | Hofmann | |
| 2006/0143075 A1 | 6/2006 | Carr et al. | |
| 2006/0178930 A1 | 8/2006 | Kim | |
| 2006/0195390 A1* | 8/2006 | Rusk et al. | 705/38 |
| 2006/0248020 A1* | 11/2006 | Robinson | 705/69 |
| 2007/0033185 A1 | 2/2007 | Maag | |
| 2007/0073630 A1 | 3/2007 | Green et al. | |
| 2007/0078869 A1 | 4/2007 | Carr et al. | |
| 2007/0083400 A1 | 4/2007 | Katz | |
| 2007/0094066 A1 | 4/2007 | Kumar et al. | |
| 2007/0094067 A1 | 4/2007 | Kumar et al. | |
| 2007/0100680 A1 | 5/2007 | Kumar et al. | |
| 2007/0100682 A1 | 5/2007 | Kazali | |
| 2007/0118421 A1 | 5/2007 | Oku | |
| 2007/0150601 A1* | 6/2007 | Angelica | 709/227 |
| 2007/0156515 A1 | 7/2007 | Hasselback et al. | |
| 2007/0203725 A1* | 8/2007 | Jung et al. | 705/1 |
| 2007/0219900 A1* | 9/2007 | MacGuire | 705/38 |
| 2007/0244741 A1 | 10/2007 | Blume et al. | |
| 2007/0256124 A1 | 11/2007 | Ih et al. | |
| 2008/0021803 A1 | 1/2008 | Ahles et al. | |
| 2008/0086415 A1 | 4/2008 | Bubris et al. | |
| 2008/0172289 A1 | 7/2008 | Oh et al. | |
| 2008/0203153 A1 | 8/2008 | Keithley et al. | |
| 2008/0270398 A1 | 10/2008 | Landau et al. | |
| 2009/0018919 A1 | 1/2009 | Walker et al. | |
| 2009/0024444 A1 | 1/2009 | Shan | |
| 2009/0198614 A1* | 8/2009 | De Ruiter et al. | 705/41 |
| 2009/0234683 A1 | 9/2009 | Anderson et al. | |
| 2009/0254484 A1* | 10/2009 | Forero | G06Q 20/12 |
| | | | 705/68 |
| 2010/0153241 A1 | 6/2010 | Rucker et al. | |
| 2010/0161379 A1 | 6/2010 | Bene et al. | |
| 2010/0241547 A1 | 9/2010 | Wolfson et al. | |
| 2010/0280880 A1 | 11/2010 | Faith et al. | |
| 2010/0280881 A1 | 11/2010 | Faith et al. | |
| 2010/0280882 A1 | 11/2010 | Faith et al. | |
| 2010/0280927 A1 | 11/2010 | Faith et al. | |
| 2010/0280950 A1 | 11/2010 | Faith et al. | |
| 2011/0000961 A1* | 1/2011 | McNeal | 235/382 |
| 2012/0030115 A1* | 2/2012 | Peace | G06Q 20/382 |
| | | | 705/44 |

FOREIGN PATENT DOCUMENTS

| | | |
|---|---|---|
| KR | 10-2006-0012541 A | 2/2006 |
| KR | 10-2006-0053214 A | 5/2006 |
| KR | 10-0726621 B1 | 6/2007 |
| KR | 10-2009-0001751 A | 1/2009 |
| WO | 95/30211 A1 | 11/1995 |
| WO | 96/36934 A1 | 11/1996 |
| WO | 00/077748 A1 | 12/2000 |
| WO | 03/038666 A1 | 5/2003 |
| WO | 2008/021381 A2 | 2/2008 |

OTHER PUBLICATIONS

Canadian Office Action mailed on Jan. 8, 2014 for CA Patent Application No. 2,760,770. 2 pages.

(56) References Cited

OTHER PUBLICATIONS

International Search Report and Written Opinion mailed Nov. 29, 2010 for PCT Patent Application No. PCT/US2010/033556, 11 pages.
Non-Final Office Action mailed on Sep. 2, 2011 for U.S. Appl. No. 12/773,770, filed May 4, 2010, 46 pages.
Final Office Action mailed on Mar. 12, 2012 for U.S. Appl. No. 12/773,770, filed May 4, 2010, 48 pages.
Non-Final Office Action mailed on Mar. 30, 2012 for U.S. Appl. No. 12/773,767, filed May 4, 2010, 13 pages.
International Search Report and Written Opinion mailed Nov. 30, 2010 for PCT Patent Application No. PCT/US2010/033567, 10 pages.
International Preliminary Report on Patentability mailed on Nov. 17, 2011 for PCT Patent Application No. PCT/US2010/033567, 7 pages.
International Search Report and Written Opinion mailed Dec. 20, 2010 for PCT Patent Application No. PCT/2010/033578, 10 pages.
Non-Final Office Action mailed on Aug. 26, 2011 for U.S. Appl. No. 12/773,763, filed May 4, 2010, 17 pages.
Final Office Action mailed on Feb. 8, 2012 for U.S. Appl. No. 12/773,763, filed May 4, 2010, 22 pages.
Non-Final Office Action mailed on Jul. 24, 2012 for U.S. Appl. No. 12/773,765, filed May 4, 2010, 23 pages.
Canadian Office Action mailed on May 25, 2012 for CA Patent Application No. 2,760,769, 4 pages.
Non-Final Office Action mailed on Mar. 30, 2012 for U.S. Appl. No. 12/773,766, filed May 4, 2010, 13 pages.
Final Office Action mailed on Oct. 12, 2012 for U.S. Appl. No. 12/773,767, filed May 4, 2012, 15 pages.
Notice of Allowance and Examiner Interview Summary mailed on Sep. 10, 2012 for U.S. Appl. No. 12/773,763, 13 pages.
Duhigg, "How Companies Learn Your Secrets," 2012, New York Times, 10 pages.
Final Office Action mailed on Dec. 7, 2012 for U.S. Appl. No. 12/773,766, filed May 4, 2010, 16 pages.
Australian Office Action mailed on Nov. 27, 2012, for AU Patent Application No. 2010246077, 4 pages.
Australian Office Action mailed on Nov. 13, 2012, for AU Patent Application No. 2010246009, 4 pages.
Russian Office Action mailed on Apr. 23, 2013 for RU Patent Application No. 2011149335/08(074022), with English Translation, 12 pages.
Australian Notice of Acceptance mailed on Aug. 22, 2013 for AU Patent Application No. 2010246077, 2 pages.
Russian Decision to Grant mailed on Aug. 22, 2013 for RU Patent Application No. 2011149335/08(074022), English Translation, 10 pages.
Australian Office Action mailed on Aug. 21, 2013, for AU Patent Application No. 2010246009, 3 pages.
Russian Decision on Grant received on Aug. 22, 2013 for RU Patent Application No. 2011149335/08(074022). English Translation, 10 pages.
Final Office Action mailed on Apr. 12, 2013 for U.S. Appl. No. 12/773,765, filed May 4, 2010, 27 pages.
Final Office Action mailed on Feb. 13, 2013 for U.S. Appl. No. 12/773,767, filed May 4, 2010, 15 pages.
Non-Final Office Action mailed on Apr. 14, 2014 for U.S. Appl. No. 12/773,770, 54 pages.
Cui, Geng et al.; "Data Mining in Marketing Using Bayesian Networks and Evolutionary Programming,"; E-Commerce and Intelligent Methods; edited by Segovia; Springer-Verlag; 2002; pp. 198-214.
Australian Notice of Acceptance mailed on Mar. 26, 2014 for AU Patent Application No. 2010246009, 2 pages.
Non-Final Office Action mailed on Aug. 25, 2014 for U.S. Appl. No. 12/773,770, 51 pages.
Final Office Action mailed on Jul. 1, 2015 for U.S. Appl. No. 12/773,765, 28 pages.
Australian Office Action mailed on May 6, 2015 for AU Patent Application No. 2013267037, 4 pages.
Final Office Action mailed on Apr. 9, 2015 for U.S. Appl. No. 12/773,766, 25 pages.
Final Office Action mailed Dec. 10, 2014 for U.S. Appl. No. 12/773,770, 60 pages.
Non-Final Office Action mailed Dec. 15, 2014 for U.S. Appl. No. 12/773,765, 25 pages.
Final Office Action mailed on Jan. 8, 2015 for U.S. Appl. No. 12/773,767, 16 pages.
Non-Final Office Action mailed on Sep. 11, 2014 for U.S. Appl. No. 12/773,767, 16 pages.
Non-Final Office Action mailed on Sep. 17, 2014 for U.S. Appl. No. 12/773,766, 18 pages.
Australian Office Action mailed on Aug. 25, 2015 for AU Patent Application No. 2010246085, 4 pages.

\* cited by examiner

PRE-AUTHORIZATION OF A TRANSACTION USING PREDICTIVE MODELING

CROSS-REFERENCES TO RELATED APPLICATIONS

The present application claims priority from and is a non-provisional continuation application of U.S. patent application Ser. No. 12/773,763, entitled "PRE-AUTHORIZATION OF A TRANSACTION USING PREDICTIVE MODELING," filed May 4, 2010, which claims priority from "U.S. Provisional Application No. 61/175,381, entitled "SYSTEMS AND METHODS FOR DETERMINING AUTHORIZATION, RISK SCORES, AND PREDICTION OF TRANSACTIONS" filed May 4, 2009, the entire contents of which are herein incorporated by reference for all purposes.

This application is related to commonly owned U.S. Patent applications entitled "DETERMINING TARGETED INCENTIVES BASED ON CONSUMER TRANSACTION HISTORY" by Faith et al., U.S. application Ser. No. 12/773,765, filed May 4, 2010, "DEMOGRAPHIC ANALYSIS USING TIME-BASED CONSUMER TRANSACTION HISTORIES" by Faith et al., U.S. application Ser. No. 12/773,766, filed May 10, 2010, "TRANSACTION AUTHORIZATION USING TIME-DEPENDENT TRANSACTION PATTERNS" by Faith et al., U.S. application Ser. No. 12/773,767, filed May 4, 2010, and "FREQUENCY-BASED TRANSACTION PREDICTION AND PROCESSING" by Faith et al., U.S. application Ser. No. 12/773,770, filed May 4, 2010, the entire contents of which are herein incorporated by reference for all purposes.

BACKGROUND

The present application is generally related to processing consumer transactions, and more specifically to the authorization of consumer transactions.

Many transactions (such as purchases, wire transfers, and the like) are performed with reference to a payment account, e.g., a credit card account, bank account, or other type of account. These types of accounts are subject to fraud since the money to pay for the transaction is not directly provided, but is instead retrieved from the payment account. For example, fraud might occur when someone other than the credit card holder uses the credit card number to make a purchase.

A reduction in fraud may be achieved in different ways. For example, when a consumer initiates a transaction with a merchant using a payment account, the merchant can send an authorization request for the payment account to a payment processing network. This authorization request can be part of a check for fraud, as well as a way to ensure that sufficient funds are available to pay for the transaction. However, such an authorization step can take a substantial amount of time. Thus, such an authorization step can reduce the amount of transactions that a merchant can handle, thereby reducing revenue. Consumers also may be delayed, which can discourage a transaction using the payment account.

Accordingly, it is desirable to provide more efficient processing of transactions while maintaining some mechanism for checking fraud.

BRIEF SUMMARY

Embodiments of the present invention can provide systems, apparatus, and methods for efficiently authorizing a transaction initiated by a consumer. In one embodiment, an authorization is generated before the consumer actually initiates the transaction. For example, a future transaction can be predicted, and an authorization can be generated for the predicted transaction. In this manner, the authorization can be ready and quickly used when the consumer does initiate the transaction. Previous transactions made by the consumer can be used to predict when the future transaction is likely. In various examples, the authorization can be sent to a specific merchant or to the consumer for use when the consumer initiates the predicted transaction, or saved by an authorization entity for use in response to an authorization request from the merchant.

According to one embodiment, a method of pre-authorizing a future transaction of a consumer is provided. Data corresponding to previous transactions is received. A computer system determines one or more patterns of the previous transactions. Based on the determined patterns, it is predicting when the consumer is likely to initiate the future transaction. An authorization of the future transaction is generated prior to the consumer initiating the transaction.

According to another embodiment, a method of using an authorization for a future transaction by a consumer is provided. The consumer performs a plurality of previous transactions. A token for authorization of a future transaction is received. The authorization is for a time when the future transaction is predicted to be likely based on the previous transactions. The consumer provides the authorization to a merchant at the time when the future transaction is predicted to be likely.

Other embodiments of the invention are directed to systems, portable consumer devices, and computer readable media associated with methods described herein.

A better understanding of the nature and advantages of the present invention may be gained with reference to the following detailed description and the accompanying drawings.

DETAILED DESCRIPTION

Processing requests from a merchant to authorize a transaction can be difficult to handle in real time while providing high accuracy (e.g. to check against fraud). However, a typical consumer does not want to wait long for a transaction to be authorized. Accordingly, embodiments can provide systems, apparatus, and methods for efficiently and accurately authorizing a transaction initiated by a consumer.

In one embodiment, an authorization is generated before the consumer actually initiates the transaction. For example, a future transaction can be predicted, and an authorization can be generated for the predicted transaction. In this manner, the authorization can be ready and quickly used when the consumer does initiate the transaction. Previous transactions made by the consumer can be used to predict when the future transaction is likely. In various examples, the authorization can be sent to a specific merchant or to the consumer for use when the consumer initiates the predicted transaction, or saved by an authorization server for use in response to an authorization request from the merchant.

Sending such a pre-authorization can save an authorization server (e.g. a server of a payment processing network) time and money. A complete authorization process does not have to be done for every authorization request, which can clog a network. For example, a response to an authorization request can simply use a previously generated authorization when the request is for a predicted transaction. Or, an authorization request may not be needed at all if the authorization request is proactively sent to a merchant or to the consumer. To maintain high accuracy, the authorization may be valid only for a future time window when the transaction is predicted to be likely. Also, the authorization for predicted transactions can be done at night or when overall network activity is low, thereby easing strain on the computational requirements of an authorization server. As another advantage, such a pre-authorization can provide the customer with a smooth transaction experience. If pre-authorization is sent to the consumer, the customer knows that the transaction can go smoothly, and thus he/she may keep performing the transaction.

I. System Overview

Figure 1:
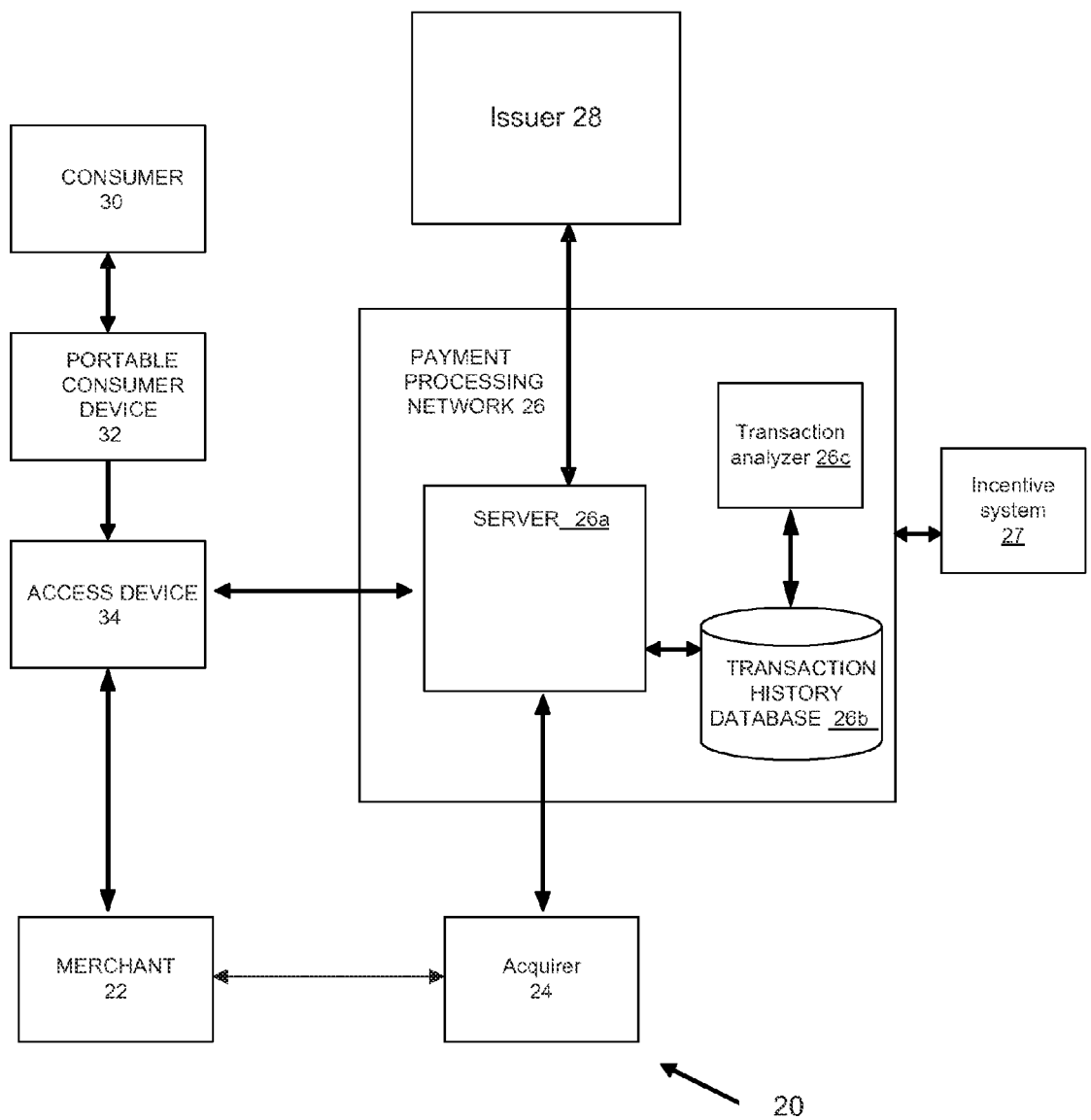
FIG. 1 shows a block diagram of a system according to an embodiment of the invention.

FIG. 1 shows an exemplary system 20 according to an embodiment of the invention. Other systems according to other embodiments of the invention may include more or less components than are shown in FIG. 1.

The system 20 shown in FIG. 1 includes a merchant 22 and an acquirer 24 associated with the merchant 22. In a typical payment transaction, a consumer 30 may purchase goods or services at the merchant 22 using a portable consumer device 32. The merchant 22 could be a physical brick and mortar merchant or an e-merchant. The acquirer 24 can communicate with an issuer 28 via a payment processing network 26. The merchant 22 could alternatively be connected directly to the payment processing network 26. The consumer may interact with the payment processing network 26 and the merchant through an access device 34.

As used herein, an "acquirer" is typically a business entity, e.g., a commercial bank that has a business relationship with a particular merchant or an ATM. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The consumer 30 may be an individual, or an organization such as a business that is capable of purchasing goods or services. In other embodiments, the consumer 30 may simply be a person who wants to conduct some other type of transaction such as a money transfer transaction or a transaction at an ATM.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

The access device 34 may also be a wireless phone. In one embodiment, the portable consumer device 32 and the access device are the same device. For example, a consumer may use a wireless to phone to select items to buy through a browser.

When the access device 34 is a personal computer, the interaction of the portable consumer devices 32 may be achieved via the consumer 30 or another person entering the credit card information into an application (e.g. a browser) that was opened to purchase goods or services and that connects to a server of the merchant, e.g. through a web site. In one embodiment, the personal computer may be at a checkout stand of a retail store of the merchant, and the application may already be connected to the merchant server.

The portable consumer device 32 may further include a contactless element, which is typically implemented in the form of a semiconductor chip (or other data storage element) with an associated wireless transfer (e.g., data transmission) element, such as an antenna. Contactless element is associated with (e.g., embedded within) portable consumer device 32 and data or control instructions transmitted via a cellular network may be applied to contactless element by means of a contactless element interface (not shown). The contactless element interface functions to permit the exchange of data and/or control instructions between the mobile device circuitry (and hence the cellular network) and an optional contactless element.

The portable consumer device 32 may also include a processor (e.g., a microprocessor) for processing the functions of the portable consumer device 32 and a display to allow a consumer to see phone numbers and other information and messages.

If the portable consumer device is in the form of a debit, credit, or smartcard, the portable consumer device may also optionally have features such as magnetic strips. Such devices can operate in either a contact or contactless mode.

Referring again to FIG. 1, the payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

As shown in FIG. 1, the payment processing network 26 may comprise a server 26a, which may be in communication with a transaction history database 26b. In various embodiments, a transaction analyzer 26c can determine patterns in transactions stored in transaction history database 26b to determine certain actions, such as authorizing a transaction or sending an incentive. In one embodiment, an incentive system 27 is coupled with or part of payment processing network 26 and can be used to determine an incentive based on determined transaction patterns. Each of these apparatus can be in communication with each other. In one embodiment, all or parts of transaction analyzer 26c and/or transaction history database 26b may be part of or share circuitry with server 26a.

The issuer 28 may be a bank or other organization that may have an account associated with the consumer 30. The issuer 28 may operate a server which may be in communication with the payment processing network 26.

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

II. Identifying Patterns

Consumer activity can include transactions, among other things. Knowledge of a pattern of transactions of a consumer can allow better fraud detection and better customer service by preparing for a predicted transaction. However, the identification of a pattern can be difficult given the enormous amount of data, some of which might exhibit patterns and some of which may not.

As used herein, the term "pattern" refers broadly to a behavior of any set of events (e.g. transactions) that have a likelihood of repeating. In one aspect, the likelihood can be greater than a random set of events, e.g., events that are uncorrelated. The likelihood can be expressed as a probability (e.g. as a percentage or ratio), a rank (e.g. with numbers or organized words), or other suitable values or characters. One type of pattern is a frequency-based pattern in which the events repeats with one or more frequencies, which may be predefined. To define a pattern, a reference frame may be used. In various embodiments, the reference frame may be or include an elapsed time since a last event (e.g. of a type correlated to the current event), since a beginning of a fixed time period, such as day, week, month, year, . . . (which is an example of a starting event), before an end of a fixed time period, or before occurrence of a scheduled event (an example of an ending event). Another event can be certain actions by the consumer, such as traveling to a specific geographic location or browsing a certain address location on the Internet.

Figure 2A:
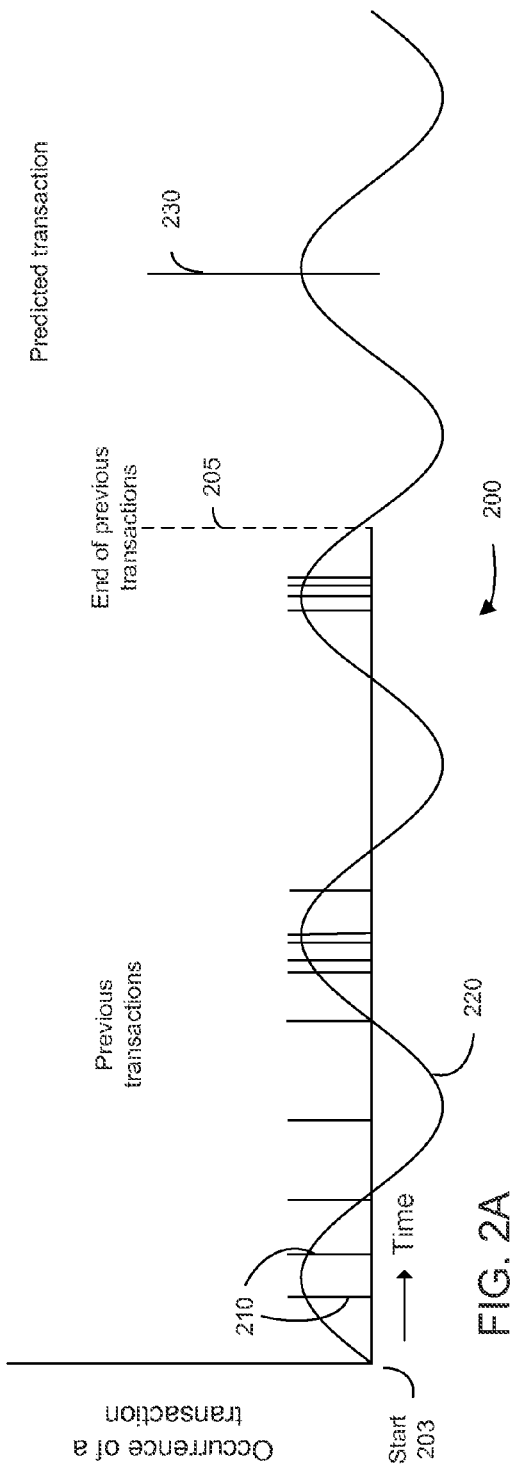
FIGS. 2A and 2B shows plots of transaction history of a consumer as analyzed according to embodiments of the present invention.

FIG. 2A shows a plot 200 of a transaction history or other events of a consumer as analyzed according to embodiments of the present invention. Plot 200 shows times at which each of a plurality of previous transactions 210 have occurred. As shown, time is an absolute time (e.g. date and time) or an elapsed time since an initial event 203. Herein, the term "time" can refer to either or both a date and a time of a particular day. These previous transactions 210, which occur before an end time 205, can be analyzed to determine a pattern 220, which can be a function that approximates when the transactions are likely to occur. As examples, an identified pattern can be used to predict a future transaction or authorize a future transaction, e.g. transaction 230.

The identification of a pattern can have many difficulties. If the previous transactions 210 include all of the transactions of a consumer and exhibit only one pattern, then the identification of a pattern may be relatively easy. However, if only certain types of transactions for a consumer show a pattern, then the identification can be more difficult. Some embodiments can use keys (K1, K2, . . . ) to facilitate the analysis of certain types of transactions, where a key can correspond to a type of transaction. The keys also allow identification of transactions as being relevant for a current task (e.g. associated with a current transaction).

For example, assume that FIG. 2A shows all of the transactions with key K1 (i.e. each of the transactions have the same key). A pattern analyzer can obtain time information by making a query for transactions only with K1 (or as another example a key pair <K1:K1>, as described below). The time information could be stored as a list of the transactions in chronological order. The occurrences of K1 transactions can then be analyzed (e.g. Fourier analysis or other functional analysis) to identify a pattern of the times and dates of these transactions. As shown, the transactions are modeled with a periodic function (such as a sine or cosine), which approximates the occurrences of the transactions. Parameters of the function(s) can be modified until a good approximation of the transactions occurring at peaks of the function(s). As shown, pattern 220 exhibits a relatively long wavelength with groups of transactions at the peaks of the pattern.

Adding to the complexity can be whether the path to a particular transaction has an impact on the pattern, e.g., a pattern that exists only when certain transactions precede or follow a transaction. Embodiments can store transaction data associated with a specific order of keys (e.g. K1, K3). In this manner, the data for that specific order can be analyzed to determine the pattern. The order of keys also allows the further identification of relevant transactions.

All of this complexity can be further compounded in instances where a certain path (sequence of two or more transactions) can have more than one pattern. Embodiments can use certain functional forms to help identify different patterns. In some embodiments, periodic functions are used, e.g., $e^{-iwt}$, where w is a frequency of the pattern. In one embodiment, the frequencies are pre-selected thereby allowing an efficient determination of the patterns. Further, the frequencies can be identified by an associated wavelength, or wavelength range. Counters can be used for each wavelength range, thereby allowing a pattern to be very quickly identified by analyzing the values of the counters.

Figure 2B:
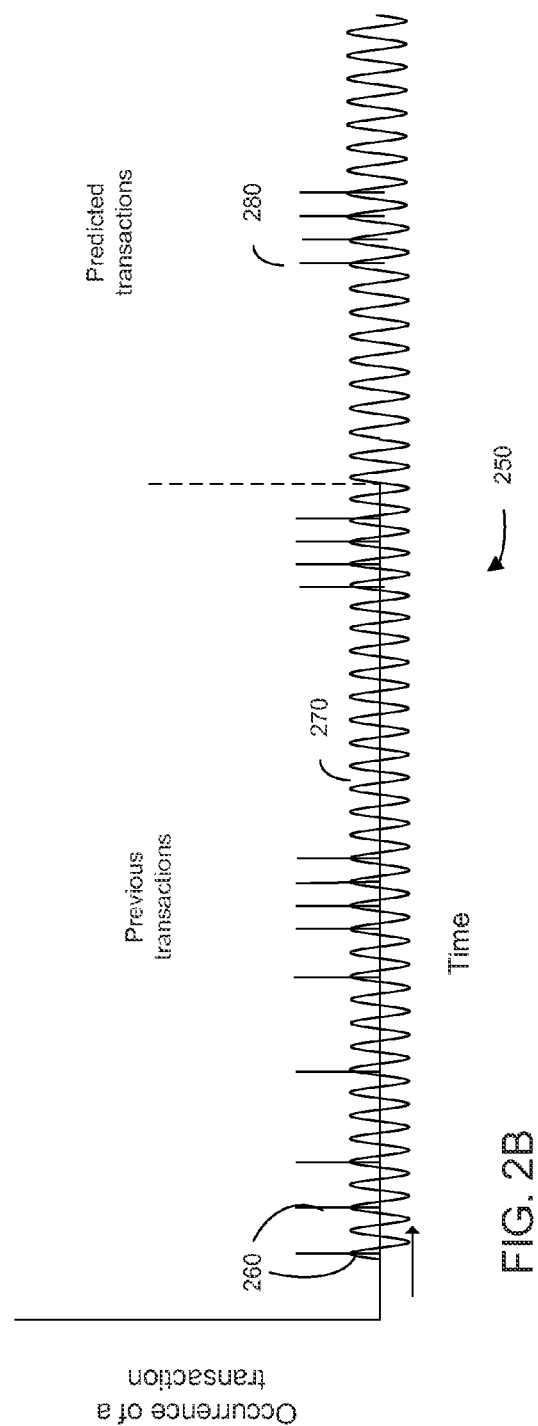

As an example of a different pattern, FIG. 2B shows a plot 250 of previous transactions 260 of a consumer as analyzed according to embodiments of the present invention. Assume plot 250 only shows K2 transactions. Time data only for K2 transactions can be identified as the specific time data can be stored associated with the key K2. Thus, a pattern 270 of previous K2 transactions can be identified by analyzing only the K2 transactions. Predicted transactions 280 can then be determined from pattern 270. If both previous transactions 210 and 260 were analyzed as a single set of previous transactions for a consumer, the different patterns 220 and 270 would be harder to identify. Other more efficient methods of determining patterns are discussed later.

III. Pre-Authorization of a Transaction

It is advantageous to be able to authorize a transaction quickly while maintaining an accurate risk assessment of the transaction, e.g. via an authorization process. As mentioned above, once a pattern has been determined, a future transaction can be predicted to occur, e.g., in a specific time window. Knowing when a future transaction might occur can allow a determination of whether to authorize the future transaction before the transaction actually occurs. Such pre-authorizing can provide quicker responses to authorization requests or can even be used to send authorization before a request is made.

Figure 3:
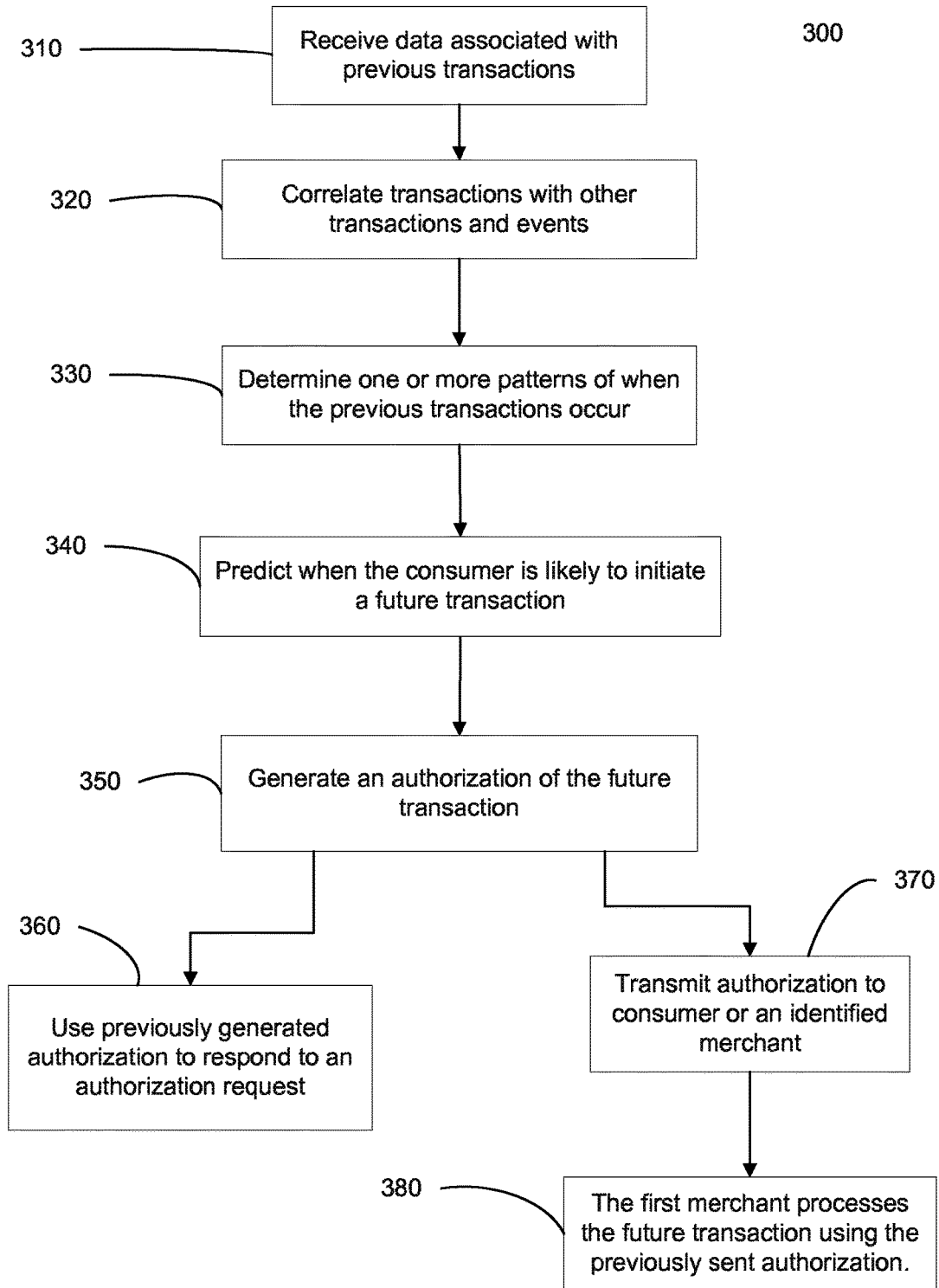
FIG. 3 is a flowchart of a method 300 for pre-authorizing a transaction of a consumer according to embodiments of the present invention.

FIG. 3 is a flowchart of a method 300 for pre-authorizing a transaction of a consumer according to embodiments. In one embodiment, previous transactions (e.g. 210) are used to determine a future transaction that can be pre-authorized, and when such an authorization can be valid. In one implementation, transactions within a specific time period are analyzed, e.g., last year or all transactions before an end time. The transactions can also be filtered based on certain criteria, such that only certain types of transactions are analyzed. The transaction history can include valid and fraudulent transactions. All or parts of method 300 or other methods herein can be performed by a computer system that can include all or parts of network 26; such a system can include disparate subsystems that can exchange data, for example, via a network, by reading and writing to a same memory, or via portable memory devices that are transferred from one subsystem to another.

In step 310, data associated with transactions previously performed, e.g. by the consumer or other similar consumers (an affinity group), is received. For example, the data in the transaction history database 26(b) can be received at a transaction analyzer 26(c) of system 20 in FIG. 1, which includes a processor that may be configured with software. Each transaction can have any number of pieces of data associated with it. For example, the data may include categories of an account number, amount of the transaction, a time and date, type or name of product or service involved in the transaction, merchant name or code (mcc), industry code, terminal field (whether a card is swiped), and geographic location (country, zip code, . . . ). In one embodiment, a merchant could be a whole chain or a particular store of a chain. In some embodiments, the transaction data can also include video and/or audio data, e.g., to identify a person or a behavior of a person. The transaction data can be different for each transaction, including the account number. For example, the consumer can be identified with the account number and other account numbers of the consumer can be included in the analysis of the behavior of the consumer.

This data can be used to identify a particular type of transaction. In one embodiment, the data for a transaction is parsed to identify one or more keys, which are used as identifiers for a particular transaction. In various embodiments, a key can includes parts of the transaction data and/or data derived from the transaction data. A key could also be composed of results from an analysis of a transaction, e.g., whether the transaction is a card-present transaction or a card-not-present transaction could be determined from the transaction data and included in the key. In one embodiment, a mapping module can perform the mapping of the transaction data to one or more keys.

A key can be composed of multiple pieces of data (referred to herein as a key element). A longer key can have more key elements and may be a more selective identifier of a type of transactions. Each transaction can be associated with different keys, each with a different scope of specificity for characterizing the transaction.

In step 320, transactions are optionally correlated with other transactions and events. In this manner, different transaction patterns can be identified for different types of transactions. Other events (e.g. start or end of a day, week, etc.) can be correlated to transactions as well. An event can also be a movement of the consumer from one state to another (e.g. from an at-home state to an on-vacation state). Different events can also be identified with keys. Herein, examples are used to described how keys are used to identify transaction types, but other suitable methods can be used.

In one embodiment, pairs of correlated keys (e.g. a key pair <KI:KF>) are determined based on whether events associated with an initial key (KI) are correlated with transactions with a final a final key (KF). A first (initial) event can be correlated with a later (final) transaction. The initial key and the final key may be the same or different from each other. For example, a transaction at one merchant may be correlated to a later purchase at another merchant, which might occur if the merchants are near to each other. In one embodiment, a group of more than two keys could be correlated together, e.g. a group of three keys can be correlated.

Two transactions can be correlated in multiple ways depending on how many keys are associated with each transaction. Thus, two transactions can contribute to more than one key pair, when the transactions are associated with multiple keys. For example, if an initial transaction is associated with two keys and the final transaction is also associated with two keys, then there could be four resulting key pairs. Also, a transaction may be correlated to another transaction only via certain keys.

In step 330, one or more patterns of when the previous transactions occur are determined with a computer system, e.g., the transaction analyzer 26(c), which can be a subsystem or one apparatus. The patterns can convey the likelihood of a transaction as a function of time. For example, pattern 220 conveys that transactions are likely when the function has a higher value.

In one embodiment, pairs of correlated transactions (or other events) are used to determine a pattern, e.g., as times of final transactions related to initial events. The times can be stored as an absolute time and/or date for each transaction (e.g. in chronological order) or organized as elapsed times for correlated events of certain key pairs. The elapsed time may be the time between a transaction with K1 and the next transaction with K2 for the correlated <K1:K2> pair. Other data can be stored as well, e.g. data not included in the keys, such as an amount of the transaction. The elapsed time can effectively equal an absolute time if the initial event is the beginning of a time period.

In some embodiments, the time information is stored (e.g. in transaction history database 26b) associated with the corresponding key pair. For example, a key pair identifier (e.g. a unique ID number) can be associated with the stored time information. As examples of an association, a key pair identifier could point to the time information, the time information could be stored in a same row as the key pair identifier, and the key pair identifier could be stored associated with the pointer.

In other embodiments, the time information for the key pair <K1:K2> can be stored in a database table that can be accessed with a query containing K1, K2, or the combination (potentially in the order of K1:K2). For example, a search for K1 and/or K2 can provide the associated identifiers. In one embodiment, a hash of each key of a pair is also associated with the key pair identifier, so that information for each key can be indexed and found separately. For example, hashes of K1 and K2 can be stored in a lookup table so the key pair identifiers (and thus the key pair information) can be easily found.

In one aspect, storing time information in association with certain key pairs can allow the time information for specific types of transactions to be easily accessed. Also, such organization can provide easier analysis of the data to identify patterns for specific key pairs. The occurrences of the transaction can then be analyzed (e.g. Fourier analysis or other functional analysis) to identify a pattern of the times and dates of these transactions.

In step 340, the one or more patterns are used to predict when the consumer is likely to initiate a future transaction. In one embodiment, the likelihood is for any transaction by the consumer, and thus the entire transaction history can be used. In another embodiment, the likelihood is for a particular transaction. When a particular transaction is being investigated, the relevant pattern can be found by querying a database using the key(s) of the particular transaction.

In some embodiments, a single point in time can be determined for the when the future transaction is likely to occur. However, such embodiments can be impractical, especially when times are reported to the second. In other embodiments, a time window when the consumer is likely to initiate a future transaction is determined. The time window may be specified in any number of ways. For example, the time window may specify a start date/time and an end date/time. Multiple time windows can be specified.

In one embodiment, the patterns of the previous transactions are used to determine a likelihood for the future transaction at a plurality of times. A time window can be identified by analyzing the consumer's transaction pattern to determine times with a desirable level of likelihood for a transaction to occur. In such embodiments, the time window can be obtained with greater accuracy since a plurality of times are used. Also, one can be more likely to identify a time window having a desirable level of likelihood since multiple times are analyzed.

A pattern can have certain indicia that can be analyzed to determine likelihoods at different times. In various embodiments, the indicia may be a number of transactions in a time range, the probability at a given point in time (e.g., as calculated from a value of the pattern function at the point in time), or other measure related to likelihood. In one aspect, the time window can be measured relative to a time when the analysis is being done (e.g. at the end time 205).

In another embodiment, the time window is determined from when the pattern shows a likelihood above a threshold value. If the likelihood is sufficiently high, it can be assumed with greater certainty that the transaction will actually be from the consumer and not a fraudster. In these and other embodiments, the duration of the time window can be variable (i.e. no predetermined) duration. For instance, the duration of the time window can be based on the likelihood values (e.g. the times when the likelihood rises above and falls below the threshold.

In some embodiments, the indicia of the relevant pattern can be input into a modeling function as part of the determination of the time window. In various implementations, the modeling function can be an optimization function (e.g. a neural network) or can be a decision tree (e.g. composed of IF THEN logic that compares the indicia to one or more cutoff values). In one embodiment, an optimization function can be trained on previous transactions, and thus can determine how much a transaction (e.g. at various times) fits the pattern of a particular entity (e.g. a consumer or merchant). In another embodiment, the number of keys associated with the transaction relates to the number of inputs into the modeling function. The relationship is not necessarily one-to-one as similar keys (e.g. ones of a same category) may be combined (e.g. same key elements, but just different values), but there may be a correspondence between the number of different types of keys and the number of inputs.

The time window for a first consumer can also be based on the transaction activity of other consumers, or in place of the transaction activity of the first consumer. For example, the pre-authorization could also be sent at a particular time that a transaction for such a product is predicted for a similar consumer, and thus can be likely for the first consumer. Such a strategy may be employed when data for the first consumer is limited and does not yet show the particular pattern.

In an embodiment using other consumers, the first consumer can be determined to be similar to an affinity group (group of similar consumers). In one aspect, consumers can be similar to an affinity group with varying degrees of similarity (e.g. by percentage of similarity). In one embodiment, a likely time window can correspond to when a corresponding affinity group has a high likelihood for the transaction at a specific time, but the consumer does not show any pattern for the transaction or has a relatively low likelihood at the specific time (but potentially high at other times). In another embodiment, the optimization algorithm mentioned above can also be trained using previous patterns from multiple entities.

Referring back to method 300, in step 350, an authorization server generates an authorization of the future transaction before the consumer initiates the transaction. In one embodiment, the authorization is generated by a payment processing network (e.g. network 26). In another embodiment, the authorization can be generated at an issuer, potentially in conjunction with a payment processing network.

In one embodiment, the authorization is only valid during a time window in which the transaction is determined to be likely. In another embodiment, the authorization could specify more than one time window, e.g., if the probability function shows a high likelihood around the 15-17$^{th}$ of the month, but only for 5 pm-10 pm. In yet another embodiment, a pre-authorization sent to a consumer or merchant can continue to be valid for a certain time every week (e.g. 5-7 pm on Thursday). In this manner, a pre-authorization does not have to be sent every week. A revocation of the pre-authorization can be sent when the likelihood of the transaction no longer supports an authorization.

In step 360, the generated authorization can be used to respond to an authorization request. When a matching authorization already exists, a normal authorization process can be bypassed. For example, if an authorization request for a current transaction is received from a merchant, the current transaction can be matched to the predicted transaction of the generated authorization. Once the current transaction is matched, an approval can be sent to the merchant. In one embodiment, an authorization server can save the generated authorization in a RAM or other local memory of a server, which can be accessed quickly.

In one implementation, keys can be used to match the current transaction with the predicted transaction. In another implementation, the matching can compare a time of when future transaction was predicted to the time of the current transaction. For example, if the time of the current transaction falls within a predicted time window, then the transaction can be authenticated as originating from the consumer. The authentication can be absolute (i.e. authenticated or not) or be at varying levels (e.g. 60% probably the consumer). The authentication can be used as one factor in an authorization procedure, which can include patterns of fraud as well as a determination of whether the consumer has sufficient funds.

In one embodiment, a token (e.g. an authorization code) associated with the authorization can be sent to the consumer, who can use it for a transaction with a merchant. A token can be any electronically identifiable object, which can include characters that can be entered for electronic transmission. A token could include the account number of a consumer. The merchant can then send the token to an authorization server (e.g. of a payment processing network), which can use the token to cross-reference a list of generated authorizations to determine if a corresponding authorization exists and if the authorization is valid (e.g. checking whether the transaction is within a time window) Once an authorization expires, the authorization can be removed form a list of valid authorizations. In one embodiment, the authorization server can be of an acquirer for the merchant, which can save the authorization. The acquirer can then respond without waiting for a response from a payment processing network or an issuer.

In step 370, as a different option to step 360, the authorization can be transmitted (e.g. from the payment processing network 26) to a server associated with a first merchant. The authorization can be sent prior to the consumer initiating a transaction, and thus the authorization is ready when the consumer initiates the transaction. In one embodiment, the authorization is only valid during a time window in which the transaction is predicted to be likely. In another embodiment, the authorization is only valid for a transaction amount less than a specified amount or within a specified range.

The first merchant can be identified via a specific pattern in which the transaction was predicted. For example, a key of a pattern can be specifically associated with a merchant or a group of merchants. The key can be identified when the transaction data includes information regarding a merchant or a merchant category. For a group of merchants, the authorization can be sent to each merchant of a group or only certain ones.

In step 380, when the transaction does occur (e.g. in the specified time window), the merchant can immediately complete the transaction since the transaction is pre-authorized. For instance, the merchant can send transaction data (which may include the token) to an acquirer, but not wait for an authorization response. A specific channel could be used so that the acquirer and a payment processing network know that a pre-authorization has been used. In another embodiment, the merchant can send the authorization (e.g. as a token) back to the authorization server, which can provide confirmation that the authorization is still valid. This may be done, for example, when a valid time window is not specified to the merchant.

Instead of sending the authorization to a merchant, the authorization can be sent to the consumer, e.g. as an authorization token. The token can be sent to the consumer in numerous ways, e.g., in any electronic message to a computing device or account associated with the consumer. For example, the token can be sent to a user's mobile phone, which can be used a payment device (e.g., portable consumer device 32). In one embodiment, the authorization can be for a specific account of the user. The token can or cannot convey a time and/or amount when the authorization is valid.

In one embodiment, such an authorization token can be coupled with an incentive. The consumer can then present the authorization code to the merchant, who can verify the code. In another embodiment, the authorization token can include information used to verify (e.g. a time when valid and a valid merchant). In embodiments where the pre-authorization is sent to the consumer, a merchant advantageously does not need to be known.

As an example, a consumer might have a predicted transaction pattern after visiting a certain website (an initial event). A future transaction can be predicted to occur within a time window correlated to the time that the website was visited. For example, a time window from 30 minutes to an hour after the website was visited can be used. If the predicted transaction does occur in that time window, a previously generated authorization can be used. As another example, a consumer's transactions can be tracked relative to the beginning of a month. For example, a person might buy lottery tickets on the 15$^{th}$ of every month. This pattern can be identified, and merchants at which the consumer might be the lottery ticket can be sent a pre-authorization, or an authorization server can generate an authorization and wait for an authorization request.

IV. Analysis of a Pattern

If a pattern of when transactions occur is known, then the pattern can be used to determine what times that a future transaction is likely to occur and be authorized. For example, if a pattern (e.g. a pattern of transactions associated with specific keys) for one or more previous months is known, embodiments can use this pattern to determine a pattern for a future month (e.g. for same month next year or for a next month). The patterns can be analyzed in numerous ways, and FIG. 4 describes some embodiments.

Figure 4:
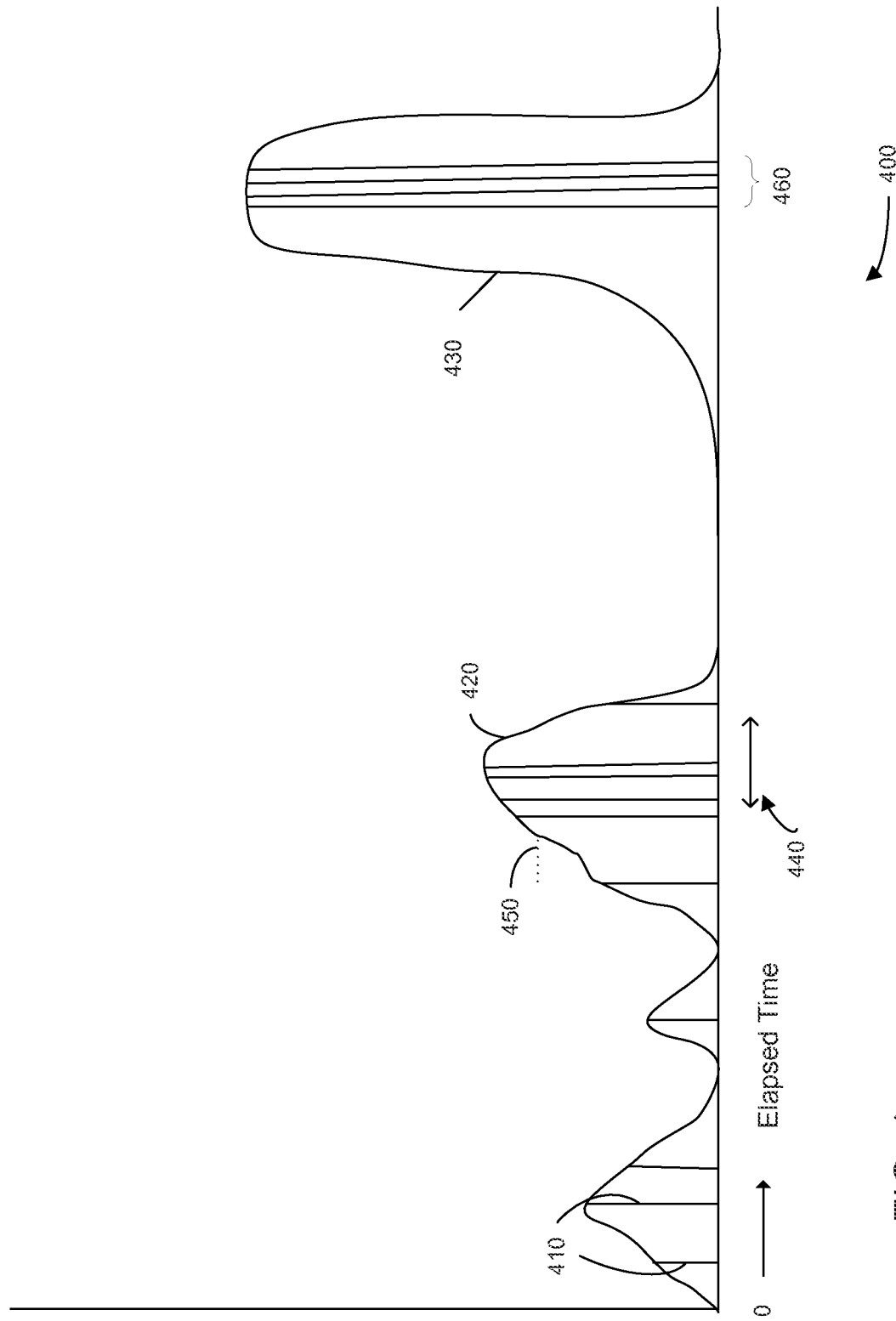
FIG. 4 is a plot of a number of transactions at certain elapsed times between a final transaction (with key KF) and an initial event (with key KI) of a correlated key pair according to embodiments of the present invention.

FIG. 4 is a plot 400 of a number of transactions at certain elapsed times between a final transaction (with key KF) and an initial event (with key KI) of a correlated key pair according to embodiments. Plot 400 can be considered as a histogram. The X axis is elapsed time between a final transaction and a correlated initial event. Any unit of time may be employed, such as minutes, hours, days, weeks, and even years. The Y axis is proportional to a number of transactions. Each bar 410 corresponds to the number of transactions at an elapsed time. Each bar 410 can increase over time as new transactions are received, where a new transaction would have an elapsed time relative to a correlated initial event. Note that more than one transaction-event pair can have the same elapsed time.

In one embodiment, the X axis can have discrete times. For example, only transactions for each day may be tracked.

Thus, if the initial event was the start of a month, then the number of discrete time periods would have a maximum of 31 days. In such an embodiment, elapsed time values within a certain range can all contribute to a same parameter, and bars 410 may be considered as counters. For example, if the discrete times were by day, any two transactions that have an elapsed time of 12 days since a correlated KI event would both cause the same counter to be increased. In one embodiment, these counters are the time information that is stored as mentioned above. In some implementations, the time ranges do not all have the same length. For example, the time ranges closer to zero can have a smaller length (e.g. just a few minutes) than the time ranges further from zero (e.g. days or months).

A pattern 420 can be discerned from the elapsed times. As shown, pattern 420 has a higher value at elapsed times where more transactions have occurred. In one embodiment, pattern 420 could simply be the counters themselves. However, in cases where the time intervals are not discrete or have a small range, bars 410 might have zero or low value at times that happen to lie between many transactions. In these cases, certain embodiments can account for transactions at a specific time as well as transactions at times that are close. For example, as shown, a function representing pattern 420 begins curving up and plateaus near the cluster 460 of transactions to form a peak 430. In one embodiment, each time point of the function can have a value of a moving average of the number of transaction within a time period before and after (or just one or the other) the time point. In other embodiments, function can be determined from interpolation or other fitting method (e.g., a fit to periodic functions) performed on the counters.

Indicia of the pattern 420, e.g., the function values, can be analyzed to determine when a transaction is likely. In one implementation, peaks of the pattern 420 are identified as corresponding to times when a transaction is likely, and a time window is determined from indicia of the peaks. In one embodiment, a width of the function at specific values or times may then be used as the time window. For example, a time window (e.g. a two day or 1.5 day period) of when transactions often occur may be determined (e.g. as may be done in 340).

The time window may be determined in any number of ways and potentially with varied criteria. In one embodiment, a full width at half maximum may be used, such as the width of peak 430. In another embodiment, the window (e.g., 440) above a threshold value 450 is used, or just part of this window, e.g., starting at the time where pattern 420 is above the threshold and ending at the top (or other part) of peak 430. In yet another embodiment, the time window may have a predetermined width centered or otherwise placed (e.g. starting or ending) around a maximum or other value above a threshold.

In embodiments using a threshold, the value of the pattern function may be required to be above the threshold value before a transaction is considered likely enough to authorize the transaction. Multiple threshold levels can be used, with the various levels potentially being used to determine a category of how likely a transaction is. The category can then be used in a determination of whether to authorize the transaction. The use of thresholds encompass using the exact likelihood values, which can be equivalent to using many threshold levels. The modeling function mentioned above may be used to perform any of these determinations.

In one embodiment, a threshold determination could be whether a counter has a high enough value (absolute or relative to one or more other counter). In another embodiment, a threshold level can be relative (e.g. normalized) compared to a total number of transactions. A normalization or determination of a threshold can be performed by adjusting the level depending on the low values of likelihood of a pattern, e.g., a peak to trough height could be used. In one aspect, the troughs may be offset to zero.

Storing time information that includes a number of transaction at certain elapsed times, one can not only handle paths (such as initial key to final key), but one can also easily identify multiple patterns. Each peak can correspond to a different pattern. For example, each peak can correspond to a different frequency of occurrence for a transaction associated with the final key relative to an event (e.g. a transaction) associated with the initial key. In one embodiment, the time information for the elapsed times can be stored by storing a time of when both events occur. In another embodiment, time information can store the elapsed time as one value. In yet another embodiment, the time of one event might implicitly include the time of the initial event (e.g. when the first event is beginning of a month or other fixed time period).

From FIG. 4, one can identify one predominant pattern (peak 430) with a long wavelength (short frequency), which does not occur very often, and three minor peaks with higher frequencies. However, the determination of a pattern might still take significant computational effort if the pattern can have any functional form.

V. Use of Periodic Functions and Counters

Some embodiments use certain functional forms to help identify different patterns. As mentioned above, periodic functions can be used, e.g., $e^{iwt}$, where w is a frequency of the pattern. For example, each bar (counter) 410 of FIG. 4 can correspond to a different frequency. The total probability V of a K2 transaction occurring at a time t after a K1 transaction can be considered as proportional to $$\sum_W C_W e^{iwt},$$

where $C_w$ corresponds to the counter value at the frequency w and w runs over all of the frequencies. $C_w$ can be considered a coefficient of the periodic function $e^{iwt}$ at a particular frequency. Thus, conceptually, a probability can be calculated directly from the above formula.

In one embodiment, the frequencies are pre-selected thereby allowing an efficient determination of the patterns. Further, the frequencies can be identified only by the associated wavelength, or wavelength range. Note that in certain embodiments, the use of $e^{iwt}$ is simply a tool and the actual value of the function is not determined.

Figure 5A:
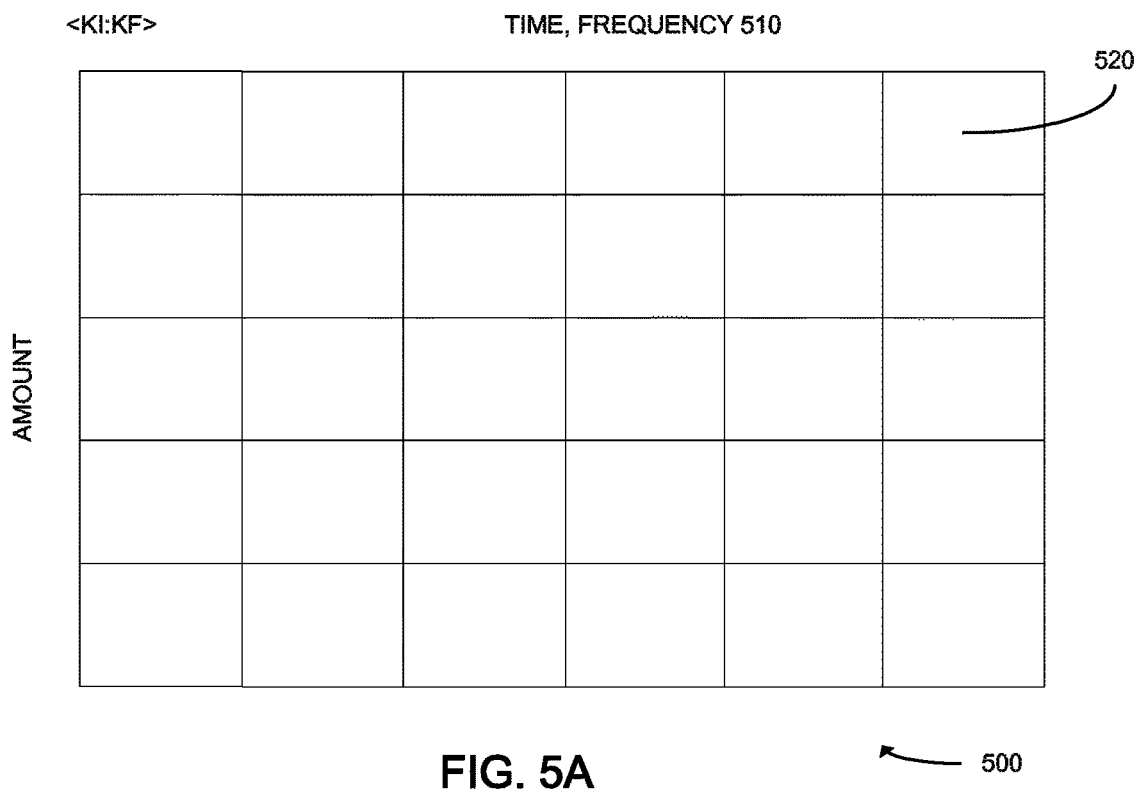
FIG. 5A shows a table for use in determining a periodic probability function that approximates a pattern of transactions according to an embodiment of the present invention.

FIG. 5A shows a table 500 that stores time information for a key pair <KI:KF> according to embodiments of the present invention. The table 500 stores information for elapsed times between transactions associated with the particular key pair. Table 500 can also store amount information for the transactions. Table 500 can be viewed as a tabular form of plot 400 along with all the possible variations for different embodiments described for plot 400.

In one embodiment, each column 510 corresponds to a different time range. The time range may correspond to ranges mentioned above with reference to FIG. 4. As shown table 500 has 6 time ranges, but any number of time ranges may be used. The time ranges can be considered to correspond to different functions that approximate the transaction patterns of a consumer or other entity. For example, each time range can correspond to or be considered a different frequency w for $e^{iwt}$.

In some embodiments, table 500 only has one row. In other embodiments, the rows of table 500 correspond to different dollar amounts (or dollar amount ranges). Thus, each time range may have subgroups for set ranges of amounts (e.g. dollar amounts). The organization is similar to a matrix, where a row or a column can be viewed as a group or subgroup. Although five amount ranges are shown, table 500 can have any number of dollar amounts. In some embodiments, there is only one row. i.e. when dollar amounts are not differentiated. Note that the convention of row and column is used for ease of illustration, but either time or amount could be used for either row or column (each an example of an axis). Also, the data for a table can be stored in any manner, e.g. as a single array or a two-dimensional array.

The values for the matrix elements 520 correspond to a number of KF transactions that have elapsed times relative to a KI event (e.g. a transaction) that fall within the time range of a particular column 510. In one embodiment, each newly received K2 transaction can cause a box (element) 520 of the table (matrix) 500 to be increased. The value of the matrix element (an example of a likelihood value) can be incremented by one for each transaction, or another integer or non-integer value. The value can also be a complex number, as described below. In another embodiment, a table can be required to have a certain total of all values, average of the values, minimum value in any matrix element, or other measure of the values in the table. Such a requirement can ensure that enough data has been received to provide an accurate pattern.

The values of the matrix elements can be used to determine the pattern for the key pair <KI:KF>, e.g. as part of step 360 of method 300. For example, matrix elements with high values relative to the other matrix elements can indicate a pattern of transactions in the corresponding time range, which can correspond to a particular frequency w. In another embodiment, one could view each matrix element in isolation to determine whether a transaction is likely. For example, if a matrix element exceeds a threshold value, it may be determined that a transaction is likely to occur in that time range. The threshold can be determined in various ways, for example, as a function of a sum of all of the matrix elements, or equivalently can be fixed with the matrix elements being normalized before a comparison to a threshold. Thus, step 330 can be accomplished easier based on how the time information is stored.

As mentioned above, the time ranges can all be of the same length (e.g. 24 hours) or be of varying lengths. In one embodiment, the first column is of very short time length, the second column is of longer time length, and so on. In this manner, more detail is obtained for short wavelengths while still allowing data to be stored for long wavelengths without exhausting storage capacity. In another embodiment, dollar amount ranges are progressively structured in a similar manner as the time ranges can be. In one implementation, the dollar amount range can be used to track the likelihood of transactions having certain dollar amounts. A predicted dollar amount for a likely transaction can be used to determine a price range in which a pre-authorization is valid.

Figure 5B:
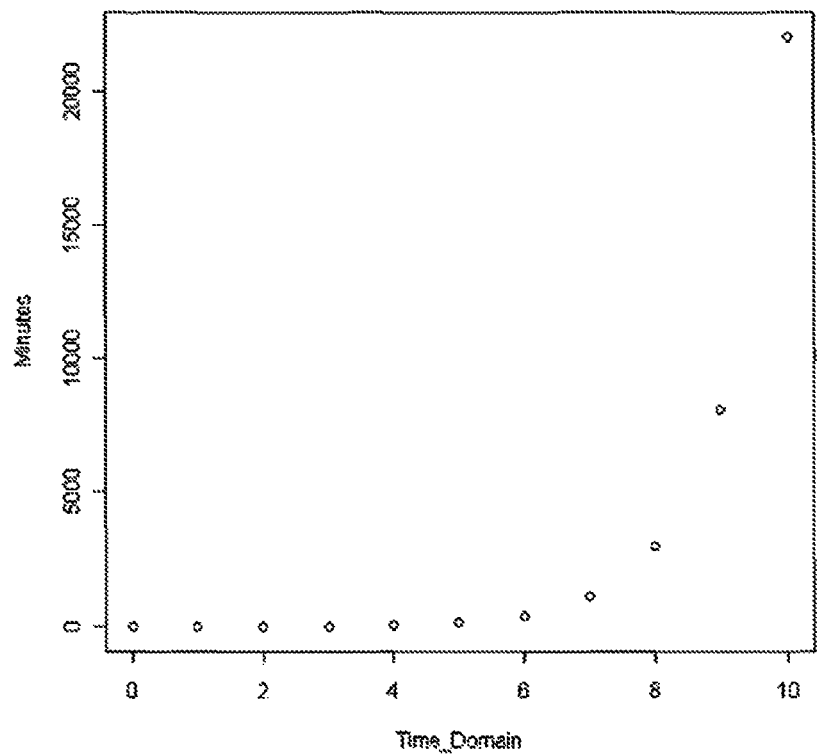
FIG. 5B shows a plot for use in determining a number of columns (buckets) of time or frequency to separate the previous transactions according to an embodiment of the present invention.

FIG. 5B shows a plot 510 for use in determining the time ranges for table 500 according to an embodiment of the present invention. The X axis corresponds to the column numbers. The Y axis corresponds to the time of a particular column in minutes. For example, the first column includes times between the first data point at time domain zero and the data point at time domain 1. Due to the large scale of the Y axis, the second data point appears to be at zero, but is simply quite small relative to the maximum value.

The wavelength λ of a pattern corresponds to the time range of a column. For embodiments, using time relative to another transaction, then the λ is the time between transactions. In one embodiment, 16 time domains (ranges) are selected as follows: $\lambda_o$ is under 1 minute, $\lambda_1$ is between 1 minute and 2.7 minutes, $\lambda_2$ is between 2.7 minutes and 7.4 minutes, $\lambda_3$ is between 7.4 minutes and 20 minutes, and $\lambda_{15}$ is over 1.2 million minutes.

The amount values can also be used to determine patterns for transactions of certain dollar amounts. If the amount is not of concern, then the values in a column can be summed to get a total value for a certain time range. The amounts can also be incorporated into the mathematical concept introduced above. For example, in mathematical notation, a value function can be defined as $$V = \sum_W C_w A e^{iwt},$$

where A is an amount of a transaction.

When a transaction is received, the amount and corresponding elapsed time for a particular key pair can be used to determine a corresponding matrix element for the key pair table. The values in the matrix elements can be normalized across one table and across multiple tables. For example, a value can be divided by a sum for all the values of a particular key pair table. Also, a sum can be calculated for all values across multiple tables, and the values for each table divided by this sum. As part of a normalization, the value for a matrix element may be decreased when some of the data used to determine the value becomes too old. For example, for a time range that includes short time intervals, counts from transactions that have occurred more than a year ago may be dropped as being out of data since short timeframe patterns can change quickly.

In various embodiments, tables for different key pairs can have different time ranges and/or amount ranges. If such differences do occur, the differences can be accounted when a summing operation is performed. In one embodiment, the values in the matrix elements can be smoothed to account for values in nearby matrix elements, e.g., in a similar fashion as pattern 420.

In another embodiment, tables for different consumers can be compared to determine affinity groups. For example, tables with matching or similar key pairs can be subtracted (lower value more similarity) or multiplied (higher value more similarity). The closer the tables are, the more similarity (e.g. as a percentage) the consumers are, where non-matching tables can be used for normalization. In one example, one set of tables can correspond to the affinity group, and the calculation can be used to determine whether a person is within the affinity group.

In other embodiments, specific amount ranges or time ranges can be suppressed. For example, if only certain types of patterns (e.g. only certain frequencies) are desired to be analyzed, then one can suppress the data for the other frequencies. In one embodiment, the suppression is performed with a mask matrix that has zeros in frequency columns and/or amount rows to be suppressed. Thus, one can just multiply the matrices to obtain the desired data. The amount ranges can be similarly suppressed. When suppressing certain frequencies, these mask matrices can act similarly to a high pass, low pass, or notch filters. For example, if one wanted a coupon to be good only for 7 days, and it takes 1 day to create the coupon, the desired time window is any time range that includes those 6 days. Accordingly, the time information for transactions outside the time window can be suppressed as not being of interest.

Regarding the creation and updating of such tables, after an event (e.g. a consumer transaction) is received, embodiments can determine which tracked key pairs have finals keys that match with the keys resulting from the transaction. As a transaction can be associated with many keys and key pairs, a transaction may cause many tables to have a matrix element updated. For example, the transaction may cause different tables for a specific consumer to be updated. The updates could be for one table for all transactions by that consumer (an example of a general table), and more specific tables for particular zip codes, merchants, and other key elements. The transaction can also cause updates of tables for the particular merchant where the transaction occurred.

As there are different tables that can be updated, each with a different initial key, the time range (and thus the matrix element) that is updated may be different for each table. For example, when elapsed time is used, the last transaction for each table may be at a different elapsed time since the different initial transactions. The transaction amount would typically be the same, thus the exact row for the matrix element to be increased can be the same, as long as the tables have the same amount ranges. But the column (i.e. time) could be different for each table.

Regarding which time column to update, there can also be more than one column updated for a particular table. For example, a K2 transaction may have different time patterns relative to K1 transactions (i.e., <K1:K2> pair). Accordingly, when a K2 transaction is received, elapsed times from the last two, three, or more K1 transactions could be used to update the table.

In a similar manner, one key pair table could be <*:K2>, which includes correlations from a plurality of initial keys to the K2 key in the same table. Effectively, this table could equal the sum of all tables where K2 is the final key for a particular consumer or other entity. However, if the individual key pairs are not significant enough, the <*:K2> table may be the only table that is tracked. Tables of the type <K1:*> could also be tracked.

VI. Impedance (Likelihood of Another Transaction)

Besides being able to predict when a particular transaction will occur, embodiments can also predict if another transaction is going to occur after a current or a predicted transaction, which is referred to as impedance. In some embodiments, such information can be tracked by using complex numbers for the matrix elements of the final event, with the imaginary part corresponding to the impedance. In other embodiments, the impedance can be tracked simply using another number for a matrix element or using another table. In one embodiment, impedance values can be used to determine whether to authorize a transaction.

In such embodiments, the imaginary part of a matrix element can correspond to an impedance that measures how likely it is that another transaction will occur. Such values can be tracked for individual consumers and/or groups of similar consumers (affinity groups). The likelihood can specifically correspond to a future transaction being correlated to the current transaction having the time range and dollar amount of the matrix element. The real value of a matrix element can correspond to the probability that the KF event will occur, and the imaginary value can relate to the probability that another event will be correlated to the KF event. The imaginary part can be updated when another transaction is correlated to the KF event of the specific time and amount. In one embodiment, a table can have just one impedance value for the likelihood of any transaction occurring later. Thus, just one imaginary part could be stored for an entire table. In another embodiment, the imaginary parts could be different for each matrix element.

In an embodiment, a low impedance (e.g. a large negative imaginary part) for a matrix element means that there is a high probability that another transaction is going to occur, and a high impedance (e.g. high positive value) means that it is unlikely that another transaction is going to occur, with zero being indeterminate. The implication of negative and positive values can be swapped. In another embodiment, a high impedance is provided by a low number (negative or positive), with larger numbers providing low impedance, or vice versa. Certain future transactions can be ignored (e.g. not counted) in determining impedance, for example, if the dollar amount is too low.

In this way, one can determine the specific instances where the transaction is a dead end (i.e. not leading to other transactions), and other instances where the transaction leads to other transactions. A high impedance would convey that the transaction is a dead end as no further transactions occur very often. Conversely, one can determine that a transaction is a gateway to many other transactions when it has a low impedance. In one embodiment, an average or sum of all of the imaginary parts of the matrix elements can be used to determine whether any future transaction is likely.

Instead of or in addition to the above use of imaginary values for impedance, greater impedance can also correspond to fraud. If a fraud transaction K2 is found to correlate to a transaction K1, then the <KI:K1> matrix elements (or just a specific element) can have the impedance increased. Thus, the impedance can reflect the profitability of the present transaction. For example, certain transactions happening right after buying a concert ticket can be associated with fraud, which is an example of where each matrix element may have its own complex part.

In some embodiments, both real and imaginary parts of a matrix element can contribute to an overall value, which can be used to determine whether to authorize a transaction. In other embodiments, values for the real or the imaginary components can be analyzed separately to determine whether a transaction is likely and then determine whether to authorize based on values for fraud or possible profit from following transactions.

VII. Using Tables to Determine Likelihood

To predict a likelihood of a future transaction, some embodiments can obtain the relevant key pair tables for the entity (e.g. a consumer) and then analyze these tables. Which tables are obtained and how they are analyzed depends on exactly what events are trying to be predicted, i.e. the question being answered.

Figure 6:
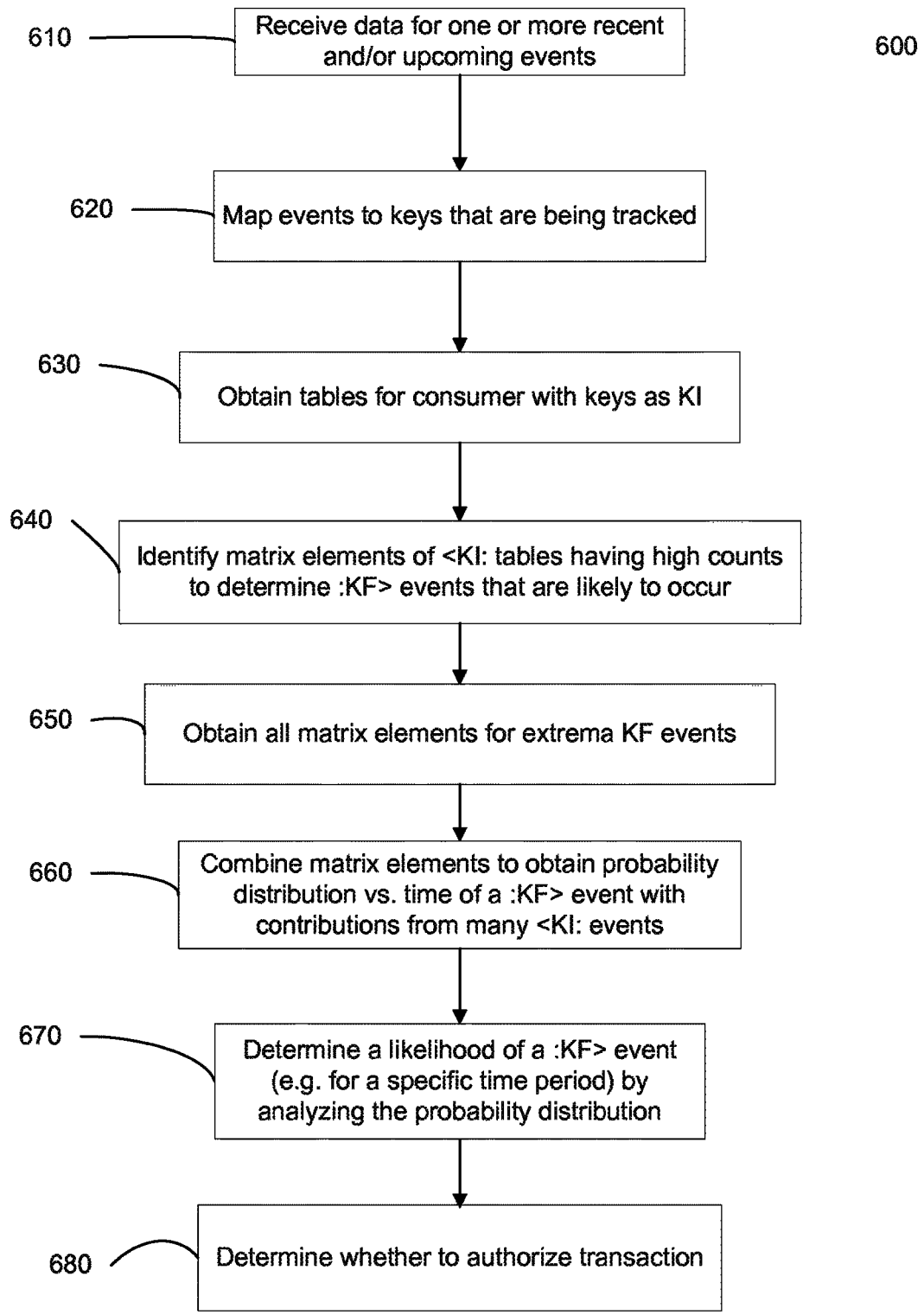
FIG. 6 is a flowchart of a method 600 for determining a likelihood of a transaction and a time window of a likely occurrence according to embodiments.

FIG. 6 is a flowchart of a method 600 for determining a likelihood of a transaction and a time window of a likely occurrence according to embodiments. Method 600 can be performed by any one, plurality, or combination of computer apparatus described herein, and components thereof.

In step 610, data for one or more recent and/or upcoming events is received. In one embodiment, the event data (e.g. transaction data) is associated with one entity, e.g., a particular consumer or affinity group. For recent events, whether an event is "recent" can be relative to other events. For example, if an event does not occur often, a recent event (e.g. a last event of that type) can still occur a long time ago in absolute terms. For an upcoming event, the event has not occurred yet, but can be known to occur. For example, the start of a month (or other time period) has a known time of occurrence. As another example, a scheduled event (such as a sporting event or concert) can be used. Data for these scheduled events can be obtained before they occur due to the nature of these events.

In step 620, the event data is used to map each event to one or more keys KI. In some embodiments, the mapped keys KI are specifically keys that are being tracked for an entity. In step 630, tables of patterns that have an initial key of KI are obtained, thereby providing <KI: tables relevant to the received event data. In one embodiment, a matching and retrieval function identifies the relevant tables using methods described herein. The matching and retrieval function can also match tables that do not have the exact same key, but similar keys. A similar key can be a broader version (e.g. first 3 digits of a zip code) of a more specific key (e.g. 5 digit zip code). Examples of when such alignment would be performed include: when a specific key for a current transaction is received, but only a broader version of that key is being tracked; and when two entities are being compared and different key pairs are tracked. In embodiments where an event is an upcoming event, the upcoming event can be a final event (or effectively the time ranges can be negative with the upcoming event being an initial event), where transactions before the ending event are analyzed.

In step 640, the <KI: tables having matrix elements with sufficiently high counts are identified to determine KF events that are likely to occur. In one embodiment, to determine whether a matrix element has a sufficiently high count, one or more absolute or relative threshold numbers can be used. A relative threshold (e.g. a percentage) could be determined using a total number of counts for a table or group of tables. In another embodiment, all tables (i.e. not just ones with a matching KI for initial key) could be analyzed to find matrix elements with high counts, thereby eliminating steps 610 to 630. However, using recent or upcoming events can provide greater timeliness for any result, or action to be performed based on a result. The identified KF events along with the specific time ranges for the matrix elements with the high counts can then be analyzed.

In step 650, other matrix elements not previously identified are obtained for each likely KF event. For example, a KF event can be correlated to more initial keys than just the ones identified in step 620. These previously unanalyzed tables can also have high counts for certain matrix elements involving a KF event. The KF event can be used as a filter to identify unanalyzed tables, from which other high-count matrix elements can be obtained. Thus, this step can be used to obtain a more accurate likelihood for a specific KF event. Obtaining these other high-count matrix elements may not be needed, e.g., if KI is starting event, such as a beginning of a week, month, etc. In this case, since other tables might include the same data points, these other tables could just include redundant information.

Also, low count matrix elements for KF events already determined to be likely can be important if high accuracy is desired. For example, as the timeframes of the different :KF> tables can be different (due to different KI events), matrix elements having relatively low counts can correspond to the same timeframe as a high-count matrix element. Thus, the number of counts for a likely time range can be revised.

In this manner, high probability KF events can be determined based on a few recent or upcoming KI events, and then a full analysis of :KF> tables can be performed, as opposed to randomly selecting KF events to determine when they might be likely to occur. A KF event could be chosen for analysis, but a selected KF event might not be highly likely. However, if one were interested in a specific KF event, then it may be desirable to start method 600 at step 650.

In step 660, the matrix elements (e.g., just from step 640 or also from step 650) are combined to obtain a probability distribution vs. time for a :KF> event, which is correlated to many <KI: events. In one embodiment, each of the matrix elements for the KF event are combined from a portion or all of the <KI:KF> tables, where KI runs over the initial events that are correlated to the KF event. This combination can account for the fact that the different KI events occur at different times, and thus the time ranges for each table can be different (e.g. offset).

In one implementation, the earliest or latest KI event can be identified, and offsets for the time ranges of the other tables can be determined. The corresponding matrix elements can then be added using the offsets. If a time range of a matrix element of one table only partially overlaps an offset time range of another table, then the combination can be broken up into more time ranges with proportional contributions from each previous rime range. For example, if two time ranges overlap, then three time sections can result. The overlap section can receive contributions (i.e. a percentage of the counts) from the two matrix elements, with the amount of contribution proportional to the amount of overlap in time for the respective time ranges.

To determine a time range of high likelihood, a probability distribution can be created from the resulting time ranges X after the combination and the counts Y for each time range. The resulting time ranges X with the respective counts Y can be analyzed as a function Y=F(X), which can correspond to pattern 420 of FIG. 4. The Y values can be normalized so that the counts for time ranges of different lengths are accounted. The Y values can also be normalized based on the dollar amount of a transaction.

In step 670, a total likelihood for a KF event (e.g. across multiple initial events) is calculated. In one embodiment, the likelihood can be for a specific time window or for the KF event occurring at any future time. A specific time window may correspond to a predetermined time range of a matrix element, or be another time range that results from an overlap of multiple time ranges. For example, if two matrix elements overlap in time (e.g. because the KI events occur at different times), then the time window may have the range of the overlap time. In another embodiment, the likelihood for a KF transaction can also be for one or more specific amounts of the transaction, which can be selected by multiplying with a mask matrix.

To determine a time range of high likelihood, the probability function F can be analyzed. For example, the function F can be analyzed with a numerical routine to identify a maximum or regions having values above a threshold (or potentially within a range, e.g., using multiple thresholds). To identify maximum regions, techniques such as finite difference, interpolation, finite element, or other suitable methods, can be used to obtain first and second derivatives of F. These derivates can then be used in an optimization algorithm for finding a maximum. Global optimization methods can also be used, such as simulated annealing.

In addition to finding a time window when an event is likely, a total probability over a specific time period can be obtained. In one embodiment, the function F can be integrated (e.g. sum counters for time ranges) over the desired time range. In effect, to obtain a probability that an event will occur within a prescribed time period, one can integrate contributions over all of the relevant key pairs during the time period. As an example with one key pair, a probability that someone will perform a certain event (e.g. a transaction) once they are visiting San Francisco can be obtained by integrating the key pair <SF:KF> over all of the desired time periods. In one aspect, time periods of greater than one month may not be relevant if a person never stays in San Francisco for that long (which could be identified from a location of a person's phone or by locations of transactions). One could also determine a probability for a transaction to occur in November in a similar way.

As an alternative to all of the above steps, one can select a particular transaction and a particular time, which can be used to select the relevant patterns from which the corresponding matrix element can be analyzed. If the tables indicate a desirable likelihood (e.g. relative to threshold values), then the transaction can be authorized.

In one embodiment, the relevant patterns from which the corresponding matrix element are selected by creating a set of key pair tables with 1 or other non-zero values in the appropriate matrix elements. These tables are then multiplied by the saved tables (i.e. known patterns) to obtain the likelihood, effectively filtering out the desired values. Besides a particular time, a time window can also be specified, which may cause more than one matrix element in a table to have a non-zero value. In this case, the non-zero values can be based on a level of overlap of the time window with the corresponding time ranges of the matrix elements.

Referring back to method 600, in step 680, it is determined whether to authorize the transaction. In one embodiment, if the transaction is not authorized, then no other action can be taken. In another embodiment, if the transaction is authorized, then a time window and/or transaction amount in which the transaction is valid can be determined. If the time window starts soon, an action that can be performed soon (e.g. saving the pre-authorization in preparation for an authorization request) can be initiated. Whereas if the time window does not start for an extended period of time, an action that takes longer (e.g. sending the pre-authorization to a merchant or consumer) can be performed.

Also, once an event is found to be likely, further analysis can be performed to determine whether to authorize a transaction. For example, a cost of an action, such as the cost of a possible loss due to fraud, can be determined as part of a cost-benefit analysis. In one embodiment, a predicted cost due to fraud can be calculated by comparing the predicted transaction and/or a pattern of recent transactions of a consumer to patterns known to be fraudulent (e.g. by multiplying tables of a consumer against tables of a fraud entity). In one embodiment, if the result of the multiplication shows a similarity to a fraud entity, then the cost of the pre-authorization can be higher. In another embodiment, a profit of an event can be determined, e.g., the profit from a transaction resulting from a pre-authorization sent to a consumer. If the profit is high, then a higher cost and lower likelihood can be tolerated.

In one embodiment, calculations for the prediction of an event can be run in real time (e.g. within several hours after an event or series of events occur). In another embodiment, the calculations can be run as batch jobs that are run periodically, e.g., daily, weekly or monthly. For example, a calculation can run monthly to determine who is likely to buy a house, and then a coupon for art, furniture, etc. can be sent to that person. In various embodiments, prediction of major purchases can generally be run in larger batches, whereas prediction of small purchases can be run in real-time (e.g., in reaction to a specific transaction).

In some embodiments, ending events also can be used similarly to predict what may happen before the event. Since the occurrence of an ending event can be known ahead of time (e.g. scheduled for a particular time), the correlated initial events can still be predicted. For example, consumer activity prior to a schedule sporting event can be determined, which may be done, e.g., using tables having negative time ranges with the ending event as an initial key or with positive time ranges with the ending event as a final key. Authorization for a transaction occurring before the sporting event (or other ending event) can be authorized and used, as described herein.

Figure 7:
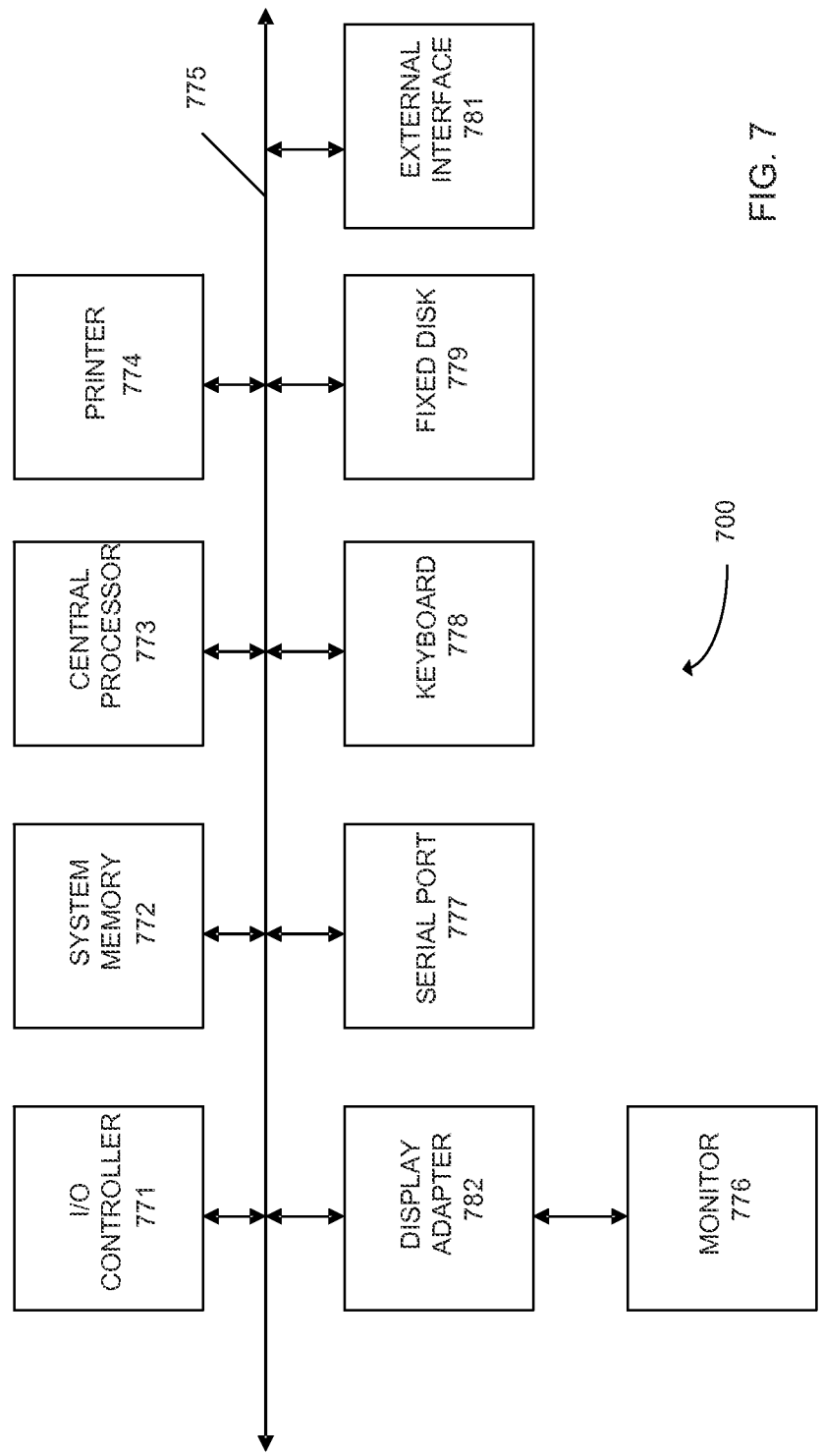
FIG. 7 shows a block diagram of an example computer system usable with systems and methods according to embodiments of the present invention.

Any of the computer systems mentioned herein may utilize any suitable number of subsystems. Examples of such subsystems are shown in FIG. 7 in computer apparatus 700. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 7 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect computer system 700 to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

A computer system can include a plurality of the same components or subsystems, e.g., connected together by external interface 781. In some embodiments, computer systems, subsystem, or apparatuses can communicate over a network. In such instances, one computer can be considered a client and another computer a server. A client and a server can each include multiple systems, subsystems, or components, mentioned herein.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices. Any of the values mentioned herein can be output from one component to another component and can be output to the user.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of using an electronic device storing an authorization for a specific future transaction by a consumer, the method comprising:

performing a plurality of previous transactions using the electronic device;

receiving, by the electronic device from an authorization server via a network, a first electronic message that includes an authorization token for authorization of a specific future transaction, wherein the authorization is for a time when the specific future transaction is predicted to be likely based on the previous transactions, wherein the authorization token is received prior to initiation of the specific future transaction, and wherein the specific future transaction is identifiable by one or more keys that characterize the specific future transaction; and providing, with the electronic device, a second electronic message including the authorization token stored on the electronic device to a merchant device at the time when the specific future transaction is predicted to be likely, wherein the time when the specific future transaction is predicted to be likely is a time window, wherein the authorization token conveys the time window within which the authorization token is valid, where the authorization token is valid only within the time window, wherein the authorization token is operable to be used during a process for authorizing a transaction that is initiated using the electronic device and that matches the one or more keys, the authorization token authorizing payment from one or more accounts of the consumer.

2. The method of claim 1, wherein the previous transactions are associated with the consumer and/or with one or more other consumers similar to the consumer.

3. The method of claim 1, wherein the previous transactions are performed with the one or more accounts of the consumer.

4. The method of claim 3, wherein the authorization is for the specific future transaction using the account.

5. The method of claim 4, wherein the authorization is for the specific future transaction within a specified price range.

6. The method of claim 1, further comprising:

transmitting data corresponding to previous transactions to a computer system.

7. The method of claim 6, where the data corresponding to previous transactions includes at least one or more of consumer data, transaction data, and merchant data.

8. The method of claim 1, wherein the authorization token for authorization of the specific future transaction is generated based on an analysis of at least the previous transactions.

9. The method of claim 1, wherein the authorization token for authorization of the specific future transaction is received a predetermined amount of time before the start of the time window for the specific future transaction.

10. The method of claim 9, wherein the electronic device is a phone.

11. The method of claim 1, wherein the authorization token for authorization of the specific future transaction includes a coupon for the specific future transaction.

12. The method of claim 1, wherein the authorization token for authorization of the specific future transaction is received in the second electronic message at a merchant access device.

13. A computer comprising:

a processor;

a memory; and a computer readable medium coupled to the processor, the computer readable medium comprising code, executable by the processor for implementing a method comprising:

performing a plurality of previous transactions;

receiving a first electronic message that includes an authorization token from an authorization server via a network, the authorization token for authorization of a specific future transaction, wherein the authorization is for a time when the specific future transaction is predicted to be likely based on the previous transactions, wherein the authorization token is received prior to initiation of the specific future transaction, and wherein the specific future transaction is identifiable by one or more keys that characterize the specific future transaction;

storing the authorization token in the memory;

providing a second electronic message including the authorization token to a merchant device at the time when the specific future transaction is predicted to be likely, wherein the time when the specific future transaction is predicted to be likely is a time window, wherein the authorization token conveys the time window within which the authorization token is valid, where the authorization token is valid only within the time window; and initiating a transaction that matches the one or more keys, the authorization token is operable to be used during a process for authorizing the transaction, the authorization token authorizing payment from one or more accounts of a consumer.

14. The computer of claim 13, wherein the authorization token for authorization of the specific future transaction is received a predetermined amount of time before the start of the time window for the specific future transaction.

15. The computer of claim 13, wherein the authorization token for authorization of the specific future transaction is generated based on an analysis of at least the previous transactions.

16. The method of claim 1, wherein the authorization token includes information to verify that the authorization token is valid for the time when the authorization token is provided to a merchant.

17. The method of claim 16, wherein the information includes the time window.

18. The method of claim 1, wherein the authorization token includes a price range for which the authorization token is valid.

19. The method of claim 1, wherein the authorization token specifies a merchant for which the authorization token is valid.

20. The method of claim 1, wherein the authorization token includes information used to verify the time window for the authorization token, a specified price range for the authorization token, and a valid merchant for the authorization token.

21. The method of claim 20, wherein the authorization token is sent to a computer system to verify the authorization token is valid for the transaction.

22. The computer of claim 13, wherein the authorization token includes information to verify that the authorization token is valid for the time when the authorization token is provided to a merchant.

23. The computer of claim 22, wherein the information includes the time window.

24. The method of claim 1, wherein the authorization token is provided to the merchant device using a contactless interface of the electronic device.

25. The computer of claim 13, further comprising:
a contactless interface, wherein the authorization token is provided to the merchant device using the contactless interface.

* * * * *